dvantagesfeatures and advantages will be more

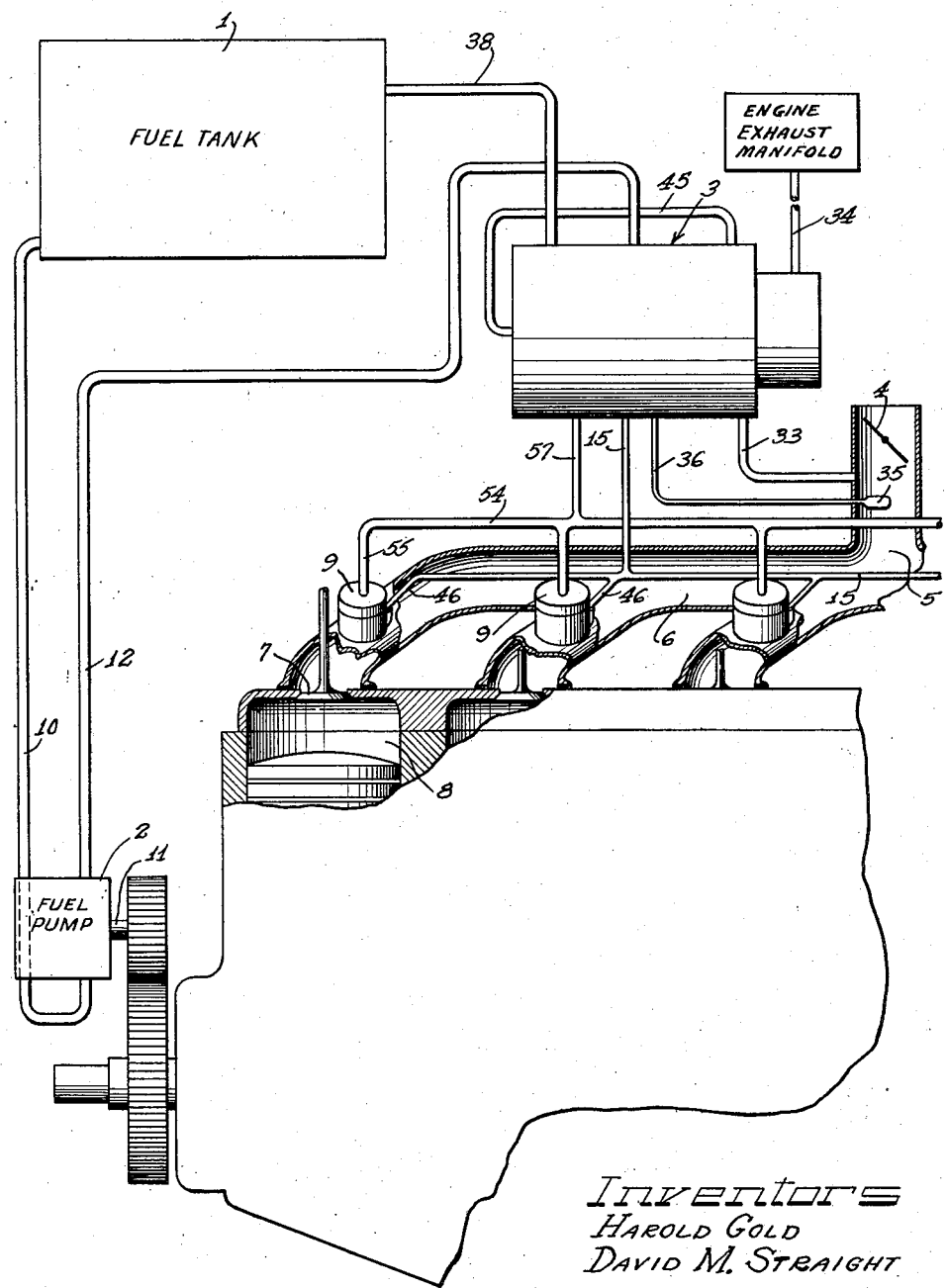

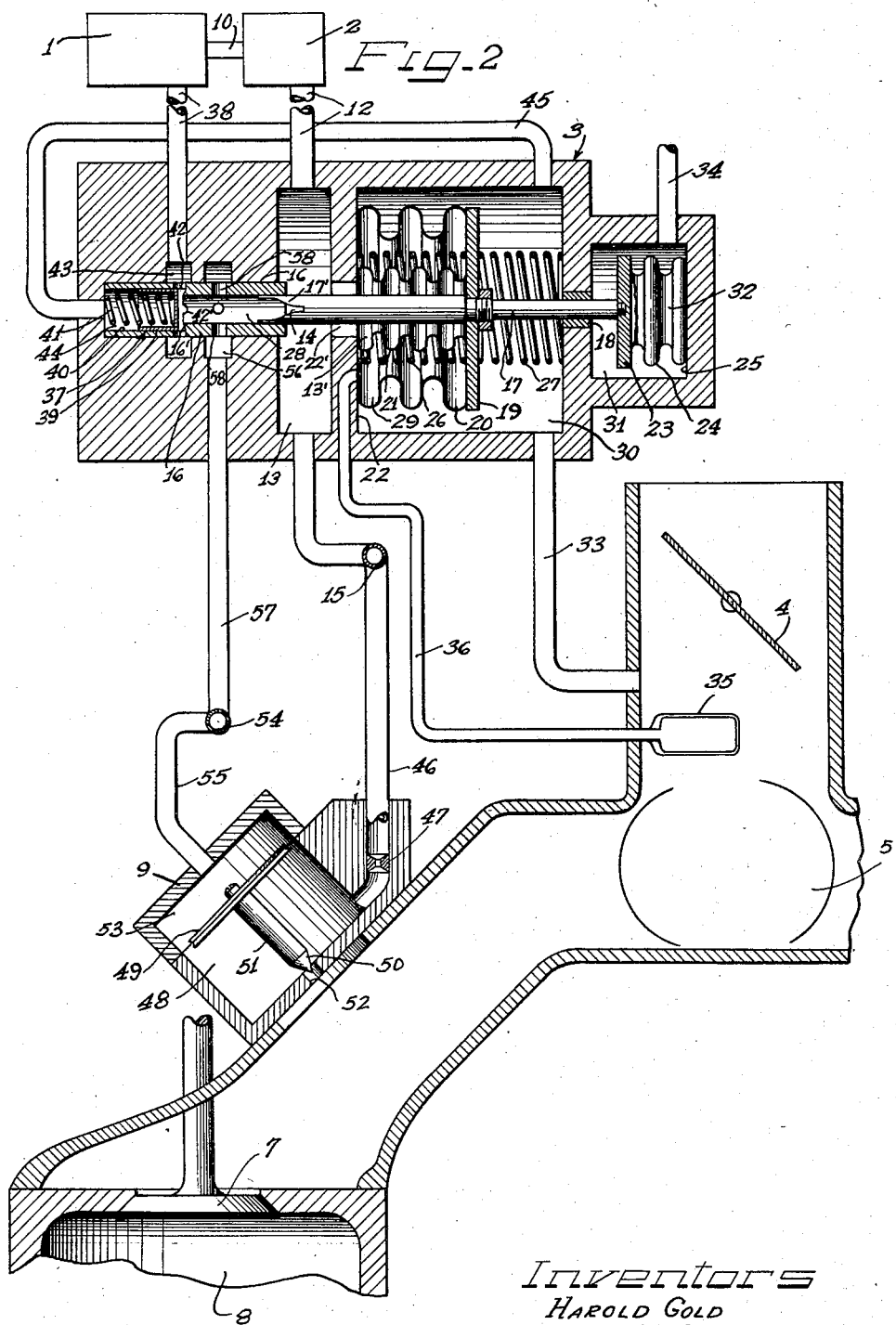

United States Patent Office 2,876,755
Patented Mar. 10, 1959

2,876,755

FUEL INJECTION SYSTEM

Harold Gold, Shaker Heights, and David M. Straight, North Olmsted, Ohio

Application August 17, 1954, Serial No. 450,428

25 Claims. (Cl. 123—119)

This invention relates to a device for automatically controlling the volumetric rate of flow of liquid to an internal combustion engine, and also for injecting the fuel, under pressure, into the intake manifold at a plurality of individual points located close to the intake ports of the cylinders of a multicylinder engine. It is inherent in the device that the rates of flow at all the points of discharge are automatically held equal.

The method of automatic regulation of the total flow of the fuel that is used in the present invention is based on the well known correlation of the mass rate of air consumption of the engine with the following parameters: intake manifold pressure, intake manifold temperature, exhaust back pressure, and engine speed (rate of revolution of the engine crankshaft).

Several devices have been previously described which utilize this air consumption correlation to regulate the flow of liquid fuel. However, the device that we shall describe differs from all previous devices in the method by which the regulation is attained. By means of this new method, the function of automatic regulation of fuel flow rate and the additional function of automatic control of fuel distribution to the intake port of each cylinder of a multicylinder engine, and the function of injection of the fuel are all performed by a single device. This combination of functions results in a great simplification over prior art devices, and over the direct combination of previously described fuel metering and fuel distribution devices. In addition this new method provides new and simple means whereby both linear and non-linear fuel flow rate-speed relationships can be automatically maintained in order to compensate for the following effects: variation of fuel-air ratio required by the engine at low engine speeds (idle); variations of engine volumetric efficiency with engine speed; variation of fuel-air ratio required by the engine at negative power output (such as in the case of engine braking in a motor vehicle on a steep downgrade). The device can also be used for single point injection without departing from the principle of operation of the metering method.

Broadly speaking, the devices that are presently known to meter fuel in accordance with the aforementioned engine parameters may be divided into two groups:

(1) Devices that vary the area of the flow controlling orifice in accordance with the parameters: intake manifold pressure, intake manifold temperature and exhaust back pressure and vary the pressure drop across the aforesaid orifice in accordance with the parameter, engine speed.

(2) Devices that vary the area of the flow controlling orifice in accordance with the parameters: intake manifold pressure, intake manifold temperature, exhaust back pressure and engine speed and maintain a fixed pressure drop across the aforesaid orifice.

The device that we shall describe provides a means whereby the flow controlling orifice is of fixed flow area and the pressure drop across the aforesaid orifice is varied in accordance with the parameters: intake manifold pressure, intake manifold temperature, exhaust back pressure and engine speed.

It is therefore an important object of the present invention to provide an improved method and means for regulating the rate of flow of fuel to an internal combustion engine.

A further object of the present invention is to provide a novel method and means for controlling fuel supply to an internal combustion engine which regulates the fuel flow rate to the intake port of each cylinder of a multi-cylinder engine, and additionally proportions the fuel between the various cylinders.

Another object of the present invention is to provide a fuel injection system combining the functions of automatic regulation of fuel flow rate, automatic control of fuel distribution to the various cylinders of a multicylinder engine, and injection of the fuel at each cylinder.

Still another object of the present invention is to provide new and simple means whereby both linear and non-linear fuel flow rate-feed relationships can be automatically maintained in accordance with varying engine requirements.

It is a more specific object of the present invention to provide novel and improved means for varying the fuel-air ratio at low engine speeds.

Another specific object is to provide a novel method and means for varying the fuel-air ratio to compensate the variation of engine volumetric efficiency with engine speed.

A further specific object of the present invention is to provide a novel method and means for varying the fuel-air ratio to compensate for a negative power output by the engine.

Other objects, features and advantages will be more fully apparent from the detailed description taken in conjunction with the accompanying drawings, in which:

Figure 1 is a diagrammatic illustration of a fuel injection system according to the present invention incorporated in a spark ignition internal combustion engine; and Figure 2 is a diagrammatic enlarged view illustrating the detailed construction of the various components of the fuel injection system of Figure 1.

Figure 1 shows the general arrangement of the invention on a spark ignition engine. The principal parts shown in the figure are: the fuel tank 1, the engine driven-positive displacement pump 2, the regulator assembly 3, the engine throttle 4, the engine intake manifold 5, the intake manifold branches 6, the engine intake valves 7, the engine combustion chambers 8, and the discharge nozzle-regulator valve assemblies 9. Also shown in Figure 1 are the connecting conduits, the function of which will be described in conjunction with Figure 2.

As indicated in Figure 1, the metered fuel is discharged into the intake manifold at separate points located near each cylinder intake port. In the description that follows it will be shown that a predetermined fuel flow rate is discharged into the intake manifold and that this flow rate is divided equally among the separate discharge points.

As shown in Figure 2, fuel is fed from tank 1 to positive displacement pump 2 through conduit 10. Pump shaft 11 is coupled to the engine crankshaft so that the pump speed (rate of revolution) is held to a fixed ratio with engine speed (rate of revolution of engine crankshaft). The volumetric rate of output of the pump 2 is then linearly proportional to engine speed.

Fuel flows from the pump 2, through conduit 12 to chamber 13 of pilot assembly 3. In chamber 13 the flow divides into two paths: one path through variable orifice 14, and the second path through fuel manifold 15 to the various assemblies 9.

Variable orifice 14 consists of sleeve 16 and contoured, slotted shaft 17. Shaft 17 is retained at its slotted end 17' by sleeve 16 and at the opposite end by bearing 18. The area of variable orifice 14 is varied as shaft 17 moves longitudinally in sleeve 16 and bearing 18. Longitudinal motion is imparted to shaft 17 by the motion of bellows head 19. Shaft 17 is rigidly fastened in a fluid tight manner to head 19. Metal bellows 20 and 21 are fastened in a fluid tight manner (such as by solder) to head 19 and fixed end 22. Shaft 17 extends through head 19 and bearing 18 and is coupled to second bellows head 23. Bellows 24 is fastened in a fluid tight manner to head 23 and fixed wall 25. Auxiliary springs 26 and 27 augment the spring rate of the metal bellows in order to obtain the desired incremental, longitudinal movement of shaft 17 in response to an incremental change in the pressures that act on the bellows assembly.

As may be seen, shaft 17 is subject to longitudinal displacement in response to changes in pressure in chambers 28, 13', 29, 30, 31 or 32. Chamber 13' is defined by the interior of bellows 21 and communicates with the chamber 13 through the aperture 22' in end wall 22 so that the pressure in chamber 13' is substantially equal to the pressure in chamber 13. Chamber 30 communicates with the intake manifold 5 through conduit 33. Chamber 31 communicates with exhaust back pressure through conduit 34. Chamber 32 is evacuated and sealed at essentially absolute zero pressure. Chamber 29, bulb 35 and conduit 36 are sealed with a predetermined mass of dry inert gas. The pressure in chamber 29 is thereby made essentially linearly proportional to the temperature of the gas in bulb 35 and hence proportional to the temperature of the air in intake manifold 5. As will be shown in the following paragraph the fuel pressure in chamber 28 varies directly with intake manifold pressure. By virtue of the pressure communications described it may be seen that shaft 17 is caused to displace longitudinally toward sleeve 16 and consequently the area of variable orifice 14 is caused to reduce, in response to either: an increase in intake manifold pressure, a decrease in intake manifold temperature, or a decrease in exhaust back pressure.

Fuel flows from variable orifice 14 into chamber 28 and then through spring loaded valve 37. From valve 37 this flow is returned to the fuel tank through conduit 38. Valve 37 consists of a piston 39 fitted with small clearance in cylinder 40. The fuel pressure in chamber 28 acts on piston 39, causing the piston to move against the load of spring 41. As the piston moves against the spring, openings 42 in the wall of cylinder 40 are uncovered. Fuel flows through openings 42 into annulus 43 from which the flow is returned to the tank through conduit 38. Piston 39 varies the area of openings 42 until equilibrium is reached between the fuel pressure in chamber 28, the load of spring 41 and the air pressure in chamber 44. Chamber 44 communicates with chamber 30 through conduit 45. The spring 41 is so designed that the change in spring load is very slight over the range of displacements of piston 39. Therefore, over a range of flow rates the fuel pressure in chamber 28 is essentially independent of the rate of flow of fuel from variable orifice 14 and is a function only of the fixed spring bias and the intake manifold pressure. Changes in intake manifold pressure result in equal changes in fuel pressure in chamber 28.

Fuel flows from chamber 13 into fuel manifold 15 and to the individual fuel discharge nozzle-regulator valve assemblies 9 located near each cylinder intake port. Each assembly 9 is connected to the fuel manifold 15 through a branch line 46. From the branch line 46 fuel flows through a fixed metering orifice 47 and into chamber 48. Valve element 50 is fastened by stem 51 to diaphragm 49 and cooperates with discharge orifice 52 to form a flow controlling valve. Chamber 53 on the opposite side of the diaphragm 49 communicates with pressure manifold 54 through branch conduit 55. Pressure manifold 54 communicates with annulus 56 through conduit 57. Annulus 56 in turn communicates with chamber 28 through holes 58 in sleeve 16.

Diaphragm 49 responds to the difference in pressure between chamber 48 and 53 and thereby positions valve element 50 to vary the open area of orifice 52. By this action the pressure in chamber 48 is automatically regulated and maintained equal to the pressure in chamber 53. By virtue of the pressure communications already described it may be seen that the pressure in the various chambers 53 are equal to the pressure in chamber 28 and hence the pressures in the various chambers 48 are automatically held equal to the pressure in chamber 28. Neglecting friction losses (which are made small by the use of large conduits) the pressure on the upstream side of each metering orifice 47 is equal to the pressure in chamber 13. By virtue of these pressure equalities the pressure difference across each metering orifice 47 is automatically held equal to the pressure difference across variable orifice 14. In view of these equalities of pressure difference, and assuming equal flow areas in the metering orifices 47, two effects may be reasoned:

(1) The volumetric rate of flow through all the metering orifices 47 are equal.

(2) The ratio of volumetric rate of flow through the variable orifice 14 to the sum of the volumetric rates of flow through the metering orifices 47 is equal to the ratio of the effective open area of variable orifice 14 to the sum of the effective areas of metering orifices 47.

As already described the volumetric rate of flow into chamber 13 from pump 2 is proportional to engine speed. The volumetric rate of flow delivered to the engine is then proportional to the engine speed and this proportionality is determined by the position of shaft 17 in sleeve 16. Shaft 17 is positioned in sleeve 16 in response to the pressures that act on the bellows assembly. Therefore at a given value of engine speed, intake manifold pressure and temperature and exhaust back pressure, a particular volumetric rate of fuel flow to the engine is automatically established. By proportioning the spring rate of the bellows assembly, the bellows areas, the area-position relation of variable orifice 14, the area of the metering orifices 47, and volumetric-output, speed-relation of the pump, the volumetric fuel flow rate to the engine in response to the engine parameters described can be made to vary according to a wide variety of schedules.

If in the device described, the rate of revolution of pump 2 is varied from zero to a finite value while the shaft 17 remains in a fixed position, the volumetric flow rate to the engine would vary in a linear manner (and in direct proportion) with the rate of revolution of the pump 2. At every rate of revolution of the pump, the ratio between the sum of the rates of flow through the metering orifices 47 and the rate of flow through the variable orifice 14 would be the same.

The chamber 13' is designed to compensate for the reduction in volumetric efficiency of the engine under high engine speed-high power output operation. Thus, if in the device described, the rate of revolution of the pump 2 is varied from zero to a finite value while the pressures in the chambers that communicate with intake manifold pressure, intake manifold temperature and exhaust back pressure are held constant, the increase of fuel pressure in chamber 13 as the pump speed is increased will cause the shaft 17 to move to the right as seen in Figure 2, opening the variable orifice 14 and thus diverting a greater amount of fuel from the branch passages such as 46 leading to the discharge orifices such as 52. This effect causes the volumetric flow rate delivered to the engine to deviate from the linear relationship with engine speed. It will be understood that the fuel pressure in chamber 13 and thus in chamber 13', will increase with increasing pump speed due to the increase that occurs in the pressure drop across the metering orifices 47 as the fuel flow rate through the metering orifices 47 increases. Because the pressure drops across the metering orifices 47 vary substantially as the square of the rate of fuel flow delivered to the engine, the effect of the metering orifice pressure drop on the variable orifice 14 is most pronounced at high engine fuel-flow rates. Thus, at high engine fuel-flow rates, the increase in pressure drop across the metering orifices 47 causes the rate of fuel delivery to the engine to be reduced below the linear proportionality with pump speed as the speed of the pump is raised. This effect compensates for the reduction in volumetric efficiency of the engine under high engine speed-high power output operation.

In order to compensate for a reduction of engine volumetric efficiency at high-speed low-power output operation, means is provided downstream of the variable orifice 14 for increasing the pressure in the chamber 28 and thus increasing the pressure downstream of the metering orifice 47 to reduce the rate of increase of fuel delivery with increasing engine speed at low power output. This means also utilizes the variation of fuel pressure in chamber 13 that results from a change in pressure drop across valve 37. The desired effect is obtained by imposing a maximum on the pressure control orifices 42 that can be uncovered by the piston 39 in pressure control valve 37, and designing the valve so that this maximum port area of the orifices 42 will be uncovered under high speed, low power conditions. With such a limit, the pressure drop across the valve 37 remains substantially constant as the flow rate through the valve 37 is increased until a predetermined upper value of flow is reached. Above this upper fuel flow limit, the pressure drop across the valve 37 increases, substantially as the square of the flow rate. At a given value of engine speed, the flow rate through the valve 37 is largest at the lowest power output. Therefore, the engine speed at which the valve 37 opens to set a maximum port area is lowest at the lowest power output. This effect is utilized to compensate for a reduction in engine volumetric efficiency at high engine speed-low power output operation. This effect may also be utilized to cause the engine fuel flow rate to be driven to substantially cut-off when the engine is motored such as in the case of engine braking in a motor vehicle on a steep downgrade.

Thus, variations of fuel pressure in chamber 13 are utilized to obtain desired non-linear relationships between the fuel flow rate delivered to the engine and engine speeds (at constant values of manifold pressure and temperature, and exhaust back pressure). One method of obtaining a non-linear relationship resides in the fact that an incremental increase in the fuel pressure in chamber 13 and thus in chamber 13' results in an incremental movement of shaft 17 and an incremental increase in the open area of variable orifice 14. An additional non-linear variation of the fuel pressure in chamber 13 with pump speed is obtained by causing the pressure drop across the valve 37 to deviate from the substantially constant value set up by the spring bias.

At low engine speeds (idle), engines of the type discussed require an enrichment of the fuel flow rate above the linear proportionality with engine speed. This additional non-linear metering requirement is met in this device by again varying the fuel pressure in chamber 13. This is accomplished by imposing a limit on the minimum port area of orifices 42 to which the piston 39 can adjust. This limit is provided by an annular abutment 16' having orifices 42' notched therein which cannot be closed by the piston 39 and which impose the limit on the minimum port area to which the valve 37 can adjust. With this limit, the pressure drop across the valve 37 remains substantially constant as the flow rate through the valve 37 is reduced until a predetermined lower limit is reached. Below this lower fuel flow limit the pressure drop across the valve 37 due to the orifices 42' decreases substantially as the square of the flow rate. This reduction in the fuel pressure in chamber 28 results in a corresponding increase of flow into the chamber 28 with a resulting reduction in the fuel pressure in chamber 13. The reduction in fuel pressure in chamber 13 that results from the reduction in the pressure drop across the valve 37, causes an increase in the fuel delivery rate above the linear proportionality with engine speed, as the engine speed is reduced in the idle range. This result is brought about by the fact that the disproportionate decrease in pressure in the chamber 28 reduces the pressure on the slotted end 17' of the shaft 17, thus tending to close the orifice 14 and reduce the amount of fuel diverted to the chamber 28. Further, the disproportionate reduction in pressure in the chamber 28 reduces the pressure in the chamber 53 and thus reduces the pressure in the chamber 48 downstream of the metering orifice 47 to tend to increase the fuel flow through the orifice 47. Additionally, it may be noted that any decrease in pressure in the chamber 13 decreases the pressure in the chamber 13' and thus tends to move the shaft 17 to the left in Figure 2, closing the variable orifice 14.

It will be appreciated that a comparable three-fold tendency obtains under high engine speed-low power output conditions, when the pressure control orifices 42 are fully uncovered by the piston 39 and the pressure in the chamber 28 tends to progressively increase with increasing fuel flow. In other words, increasing pressure in the chamber 28 tends to move the shaft 17 to the right by virtue of the pressure acting on the end 17' thereof from the chamber 28. The increase in pressure in the chamber 13 due to the increase in pressure in the chamber 28 likewise tends to move the shaft 17 to the right by virtue of the corresponding increase in pressure in the chamber 13', and finally, the increased pressure in the chamber 28 is transmitted to the chamber 53 of the diaphragm control discharge valve 50 to tend to increase the pressure in the discharge chamber 48, thus tending to decrease the flow through the metering orifice 47.

It will be apparent that many modifications and variations may be made without departing from the concepts of the present invention.

We claim as our invention:

1. In a fuel supply system for an internal combustion engine, a fuel conduit, means for delivering fuel to said conduit at a rate varying in accordance with engine speed, a flow controlling orifice in said conduit, means communicating with said conduit and operative in conjunction with said fuel delivering means to automatically control the pressure differential across said orifice in accordance with parameters reflecting the air intake rate of said engine, and means responsive to a relatively high rate of fuel delivery to said conduit for reducing the rate of increase in pressure differential across said orifice with increasing rate of fuel delivery to reduce the rate of increase in fuel flow through said orifice at high engine speeds.

2. In a fuel supply system for an internal combustion engine, a fuel conduit, means for delivering fuel to said conduit at a rate varying in accordance with engine speed, a flow controlling orifice in said conduit, means connecting with said conduit upstream and downstream of said orifice and operative in conjunction with said fuel delivering means for automatically varying the pressure differential across said orifice in accordance with parameters reflecting the air intake rate of said engine, and means responsive to high engine speed and low power output for reducing the rate of increase of pressure differential across said orifice with increasing engine speed to reduce the rate of increase in fuel delivery through said orifice under high engine speed and low power output conditions.

3. In a fuel supply system for an internal combustion engine, a fuel conduit, means for delivering fuel to said conduit at a rate varying in accordance with engine speed, a flow controlling orifice in said conduit, means communicating with said conduit upstream and downstream of said orifice and operative in conjunction with said fuel delivering means for controlling the pressure differential across said orifice in accordance with parameters reflecting the air intake rate of said engine, and means responsive to a relatively low rate of fuel delivery to said conduit to reduce the rate of decrease of pressure differential across said orifice with decreasing fuel delivery rate to increase the fuel-air ratio at low engine speeds.

4. In a fuel supply system for an internal combustion engine, a fuel conduit, means for delivering fuel to said conduit at a rate varying in accordance with engine speed, a flow control orifice in said conduit downstream of said delivering means, means downstream of said flow control orifice for delivering fuel to said engine from said fuel conduit, a fuel diversion passage connecting with said conduit downstream of said delivering means and upstream of said flow control orifice for diverting fuel from said engine, variable orifice means controlling flow from said conduit through said flow diversion passage, means automatically controlling said variable orifice means in accordance with parameters reflecting the rate of air intake to said engine in each revolution of said engine, and separate means responsive to an increase in pressure upstream of said flow control orifice to increase the flow area of said variable orifice means to compensate for low volumetric efficiency under high engine speed-high power output conditions.

5. In a fuel supply system for an internal combustion engine, a fuel conduit, means for delivering fuel to said conduit at a rate varying in accordance with engine speed, a flow control orifice in said conduit downstream of said delivering means, means downstream of said flow control orifice for delivering fuel to said engine, a fuel diversion passage connecting with said conduit downstream of said delivery means and upstream of said flow control orifice for diverting fuel from said engine, variable orifice means controlling flow from said conduit through said diversion passage, means automatically controlling said variable orifice means in accordance with parameters reflecting the rate of air intake to said engine in each revolution of said engine, flow control valve means in said fuel conduit downstream of said flow control orifice and operative to control the pressure downstream of said flow control orifice, means for controlling said flow control valve means and responsive to fluid pressure downstream of said variable orifice means, means for maintaining the pressure downstream of said variable orifice means substantially constant over a given speed range for constant air intake pressure, and means for relatively decreasing pressure downstream of said variable orifice means at speeds below said given speed range.

6. In a fuel supply system for an internal combustion engine, a fuel conduit, means for delivering fuel to said conduit at a rate varying in accordance with engine speed, a flow control orifice in said conduit downstream of said delivering means, means downstream of said flow control orifice for delivering fuel to said engine, a fuel diversion passage connecting with said conduit downstream of said delivering means and upstream of said flow control orifice for diverting fuel from said engine, variable orifice means controlling flow from said conduit through said diversion passage, means automatically controlling said variable orifice means in accordance with parameters reflecting the rate of air intake to said engine in each revolution of said engine, flow control valve means in said fuel conduit downstream of said flow control orifice and operative to control the pressure downstream of said flow control orifice, means for controlling said flow control valve means and responsive to fluid pressure downstream of said variable orifice means, and means for relatively increasing pressure downstream of said variable orifice means at low air intake pressure and high engine speed.

7. In a fuel supply system for an internal combustion engine, a fuel conduit, means in said conduit for delivering fuel at a rate varying in accordance with engine speed, a flow controlling orifice in said conduit downstream of said delivering means having a fixed flow area, a fuel diversion passage communicating with said fuel conduit downstream of said delivering means and upstream of said orifice and leading to the upstream side of said delivering means, variable orifice means controlling flow from said conduit through said diversion passage, means automatically controlling said variable orifice means in accordance with parameters reflecting the rate of air intake to said engine in each revolution of said engine, flow control valve means in said fuel conduit downstream of said flow control orifice and operative to control the pressure downstream of said flow control orifice, means for controlling said flow control valve means and responsive to fluid pressure downstream of said variable orifice means, pressure control orifice means downstream of said variable orifice means in said fuel diversion passage, pressure control valve means in said fuel diversion passage controlling said pressure control orifice means to control pressure downstream of said variable orifice means, means biasing said pressure control valve means toward closing relation to said pressure control orifice means and operative to maintain a relatively constant pressure downstream of said variable orifice means at constant air intake pressure, and means limiting movement of said pressure control valve means toward closing relation to said pressure control orifice means to provide for a progressive decrease in pressure downstream of said variable orifice means with decreasing fuel delivery rate at low fuel delivery rates to increase the fuel-air ratio at low engine speeds.

8. In a fuel supply system for an internal combustion engine, a fuel conduit, means in said conduit for delivering fuel at a rate varying in accordance with engine speed, a flow controlling orifice in said conduit downstream of said delivering means having a fixed flow area, a fuel diversion passage communicating with said fuel conduit downstream of said delivering means and upstream of said orifice and leading to the upstream side of the delivering means, variable orifice means controlling flow from said conduit through said diversion passage, means automatically controlling said variable orifice means in accordance with parameters reflecting the rate of air intake to said engine in each revolution of said engine, flow control valve means in said fuel conduit downstream of said flow control orifice and operative to control the pressure downstream of said flow control orifice, means for controlling said flow control valve means and responsive to fluid pressure downstream of said variable orifice means, pressure control orifice means downstream of said variable orifice means in said fuel diversion passage, pressure control valve means in said fuel diversion passage controlling said pressure control orifice means to control pressure downstream of said variable orifice means, means biasing said pressure control valve means toward closing relation to said pressure control orifice for maintaining a relatively constant pressure downstream of said variable orifice means at constant air intake pressures, said biasing means being operative to accommodate full open relation of said pressure control valve means to said pressure control orifice means at low intake pressure and high engine speed to provide a progressively increasing pressure downstream of said variable orifice means with increasing fuel delivery rate at high fuel delivery rates with low intake pressure.

9. In a fuel supply system for an internal combustion engine, a plurality of fuel injection points for said engine, a plurality of branch conduits each leading to one of said fuel injection points, a main conduit for supplying said branch conduits, means for delivering fuel to said main conduit at a rate varying in accordance with engine speed, flow control orifice means in each branch conduit, a fuel diversion passage connecting with said main conduit downstream of said delivering means for diverting fuel from said branch conduits, variable orifice means controlling flow from said main conduit through said diversion passage, means automatically controlling said variable orifice means in accordance with parameters reflecting the rate of air intake to said engine in each revolution of said engine, and means for equalizing the pressures downstream of each of said flow control orifice means in said branch conduits for proportioning the flow of fuel in the respective branch conduits in accordance with the flow area of said flow control orifice means therein.

10. In a fuel supply system for an internal combustion engine, a plurality of fuel injection points for said engine, a plurality of branch conduits each leading to one of said fuel injection points, a main conduit for supplying said branch conduits, means for delivering fuel to said main conduit at a rate varying in accordance with engine speed, flow control orifice means in each branch conduit, a fuel diversion passage connecting with said main conduit downstream of said delivering means for diverting fuel from said branch conduits, variable orifice means controlling flow from said main conduit through said diversion passage, means automatically controlling said variable orifice means in accordance with parameters reflecting the rate of air intake to said engine in each revolution of said engine and means for equalizing the pressures downstream of each of said flow control orifice means in said branch conduits for proportioning the flow of fuel in the respective branch conduits in accordance with the flow area of said flow control orifice means therein comprising branch flow control valve means in each of said branch conduits downstream of the respective flow control orifice means and operative to control the pressure downstream of each of said flow control orifice means.

11. In a fuel supply system for an internal combustion engine, a fuel discharge orifice leading to the engine air intake, discharge control valve means controlling said discharge orifice, a flow controlling orifice upstream of said discharge orifice, means controlling the pressure differential across said flow controlling orifice in accordance with the rate of air intake of said engine, and means acting on said discharge valve means to control the pressure downstream of said flow controlling orifice to vary the flow rate through said flow controlling orifice from the rate schedule provided by said differential pressure control means under predetermined engine conditions.

12. In a fuel supply system for an internal combustion engine, a plurality of fuel discharge orifices for said engine, a plurality of discharge valve means each controlling one of said discharge orifices, a plurality of branch conduits each leading to one of said discharge orifices, a main conduit connecting with said branch conduits upstream of said branch conduits, means for delivering fuel to said main conduit at a rate varying in accordance with engine speed, flow control orifice means in each branch conduit upstream of said discharge orifice therein, a flow diversion passage connecting with said main conduit downstream of said delivering means, variable orifice means controlling flow from said main conduit through said diversion passage, means automatically controlling said variable orifice means in accordance with parameters reflecting the rate of air intake to said engine in each revolution of said engine, means controlling each of said discharge valve means and responsive to fluid pressure downstream of said variable orifice means to maintain the pressure downstream of each of said flow control orifices equal to the pressure downstream of said variable orifice means, whereby the fuel delivered through said discharge orifices is proportioned in accordance with the flow areas of said flow control orifices.

13. In a fuel supply system for an internal combustion engine, a plurality of fuel discharge orifices each for injection of fuel near one of the cylinder intake ports of a multicylinder internal combustion engine, diaphragm operated discharge valve means controlling each of said fuel discharge orifices, a plurality of branch conduits each leading to one of said fuel discharge orifices and acting on the associated diaphragm operated discharge valve to tend to open said discharge orifice associated therewith, a relatively fixed metering orifice in each of said branch conduits, a main conduit connected with each of said branch conduits, a main conduit connected with each of said branch conduits upstream thereof, an engine driven fuel pump for delivering fuel to said main conduit at a rate proportional to engine speed, flow diversion means communicating with said main conduit downstream of said pump for diverting fuel from said branch conduits, means for controlling said variable orifice means in accordance with parameters reflecting the rate of air intake of said engine in each revolution of said engine, and pressure control means communicating with each of said diaphragm operated discharge valves and acting on said valves to tend to close said discharge orifices and operative to equalize the pressure downstream of each of said relatively fixed metering orifices in said branch conduits, whereby the fuel delivery rate to said discharge orifices is proportioned in accordance with the area of said metering orifices and is regulated in accordance with engine requirements.

14. In a fuel supply system for an internal combustion engine, a fuel conduit, means for supplying fuel to said conduit at a rate proportional to engine speed, a fixed orifice in said conduit, a variable orifice means in said conduit upstream of said fixed orifice for diverting fuel from said conduit, and means for statically equalizing the pressure downstream of said fixed orifice and the pressure downstream of said variable orifice, said variable orifice means being responsive to parameters reflecting air intake to said engine in each revolution of said engine.

15. The method of regulating the supply of fuel to an internal combustion engine, which comprises establishing a flow of fuel from a fuel source to the air intake of the engine, restricting the area of the flow path at a given point therealong to a fixed predetermined area, varying the pressure upstream of said restriction in accordance with parameters reflecting the rate of air intake to said engine, reducing the rate of increase of pressure upstream of said restriction with increasing engine speed under high speed conditions, increasing the pressure downstream of said restriction under conditions of high engine speed and low air intake pressure, and relatively reducing the pressure downstream of said restriction under low engine speed conditions.

16. In a fuel supply system for an internal combustion engine, a fuel conduit, means for supplying fuel to said conduit at a rate proportional to engine speed, a fixed orifice in said conduit, a variable orifice means in said conduit upstream of said fixed orifice for diverting fuel from said conduit, means statically equalizing the pressure downstream of said fixed orifice and the pressure downstream of said variable orifice means, means automatically controlling said variable orifice means in accordance with parameters reflecting air intake to said engine in each revolution of said engine, said automatic controlling means acting to decrease the open area of said variable orifice means upon an increase in air intake to said engine in each revolution of said engine.

17. In a fuel supply system for an internal combustion engine, a fuel conduit, means for delivering fuel to said conduit at a rate varying in accordance with engine speed over a substantial speed range, a flow controlling orifice in said conduit having a relatively fixed flow area over said speed range, upstream pressure control means in said fuel conduit upstream of said flow controlling orifice and operative to automatically control the pressure upstream of said orifice, and downstream pressure control means in said fuel conduit downstream of said orifice and operative to automatically control the pressure downstream of said orifice, said upstream pressure control means and said downstream pressure control means being operative in conjunction with said fuel delivering means to control the pressure differential across said orifice, said pressure control means being responsive to changes in intake manifold pressure, intake manifold temperature and exhaust back pressure and operative to increase the pressure differential across said orifice in response to increasing intake manifold pressure, decreasing intake manifold temperature and decreasing exhaust back pressure.

18. In a fuel supply system for an internal combustion engine, a fuel conduit, an engine driven fuel pump in said conduit for delivering fuel at a rate varying in accordance with engine speed, a flow control orifice in said conduit downstream of said pump, means downstream of said flow control orifice for delivering fuel from said conduit to said engine, a fuel flow diversion passage connecting with said conduit downstream of said pump and upstream of said flow control orifice for diverting fuel from said engine, variable orifice means controlling flow from said conduit through said diversion passage, and control means automatically controlling said variable orifice means, said control means being responsive to changes in intake manifold pressure, intake manifold temperature and exhaust back pressure and operative to decrease the flow area of said variable orifice means in response to increasing intake manifold pressure, decreasing intake manifold temperature and decreasing exhaust back pressure.

19. In a fuel supply system for an internal combustion engine, a fuel conduit, means for delivering fuel to said conduit at a rate varying in accordance with engine speed, a flow control orifice in said conduit downstream of said delivering means, means downstream of said flow control orifice for delivering fuel to said engine, a fuel diversion passage connecting with said conduit downstream of said delivering means and upstream of said flow control orifice for diverting fuel from said engine, variable orifice means controlling flow from said conduit through said diversion passage, control means automatically controlling said variable orifice means, said control means being responsive to changes in intake manifold pressure, intake manifold temperature and exhaust back pressure and operative to decrease the flow area of said variable orifice means in response to increasing intake manifold pressure, decreasing intake manifold temperature and decreasing exhaust back pressure, flow control valve means in said fuel conduit downstream of said flow control orifice and operative to control the pressure downstream of said flow control orifice, and means for controlling said flow control valve means and responsive to fluid pressure downstream of said variable orifice means.

20. In a fuel supply system for an internal combustion engine, a fuel conduit, means for delivering fuel to said conduit at a rate varying in accordance with engine speed, a flow control orifice in said conduit downstream of said delivering means, means downstream of said flow control orifice for delivering fuel to said engine, a fuel diversion passage connecting with said conduit downstream of said delivery means and upstream of said flow control orifice for diverting fuel from said engine, variable orifice means controlling flow from said conduit through said diversion passage, control means automatically controlling said variable orifice means, said control means being responsive to changes in intake manifold pressure, intake manifold temperature and exhaust back pressure and operative to decrease the flow area of said variable orifice means in response to increasing intake manifold pressure, decreasing intake manifold temperature and decreasing exhaust back pressure, flow control valve means in said fuel conduit downstream of said flow control orifice and operative to control the pressure downstream of said flow control orifice, means for controlling said flow control valve means and responsive to fluid pressure downstream of said variable orifice means, and means for regulating the pressure downstream of said variable orifice means in response to variations in air intake pressure of said engine.

21. In a fuel supply system for an internal combustion engine, a plurality of fuel injection points for said engine, a plurality of branch conduits each leading to one of said fuel injection points, means for delivering fuel to said conduits at a rate varying in accordance with engine speed, flow controlling orifice means in each branch conduit, means for maintaining the pressures downstream of said flow controlling orifice means of each branch conduit substantially equal, means for maintaining the pressures upstream of each flow controlling orifice means of each branch conduit substantially equal, and control means operative in conjunction with said fuel delivering means for controlling the pressure differential across each of said flow control orifice means, said control means being responsive to changes in intake manifold pressure, intake manifold temperature and exhaust back pressure and operative to increase the pressure differential across each of said flow control orifice means in response to increasing intake manifold pressure, decreasing intake manifold temperature and decreasing exhaust back pressure.

22. In a fuel supply system for an internal combustion engine, a fuel conduit, means for supplying fuel to said conduit at a rate proportional to engine speed, a fixed orifice in said conduit, a variable orifice means in said conduit upstream of said fixed orifice for diverting fuel from said conduit, and means for statically equalizing the pressure downstream of said fixed orifice and the pressure downstream of said variable orifice, and control means controlling said variable orifice means automatically and automatically responsive to changes in intake manifold pressure, intake manifold temperature and exhaust back pressure, said automatic controlling means being operative to decrease the open area of said variable orifice means in response to increasing intake manifold pressure, decreasing intake manifold temperature and decreasing exhaust back pressure in each revolution of said engine.

23. In a fuel supply system for an internal combustion engine, a fuel conduit, a fuel pump for supplying fuel to said conduit at a rate proportional to engine speed, a fixed orifice in said conduit, a fuel diversion passage for communication with said fuel conduit and leading to the upstream side of said pump, a valve having a variable orifice controlling communication between said fuel conduit and said fuel diversion passage and having a valve member movable to control the flow area of said variable orifice, means statically equalizing the pressure downstream of said fixed orifice and the pressure downstream of said variable orifice in said fuel diversion passage, and means automatically controlling said valve member to control the flow area of said variable orifice, said automatic controlling means being responsive to changes in intake manifold pressure, intake manifold temperature and exhaust back pressure and operative to decrease the flow area of said variable orifice in response to increasing intake manifold pressure, decreasing intake manifold temperature and decreasing exhaust back pressure.

24. In a fuel supply system for an internal combustion engine, a fuel conduit, means for supplying fuel to said conduit at a rate directly proportional to engine speed, a fuel return conduit of reduced pressure relative to said fuel conduit, a variable orifice means having a relatively movable valve member therein between the fuel conduit and the return conduit, and means varying the relative position of said valve member and orifice and the fuel delivered to said return conduit in accordance with parameters reflecting the air intake rate of the engine, said variable orifice and valve member shaped to obtain an accelerating flow rate at low increasing air intake rates and a decelerating flow rate at high increasing air intake rates.

25. In a fuel supply system for an internal combustion engine, a fuel conduit, means for supplying fuel to said conduit at a rate directly proportional to engine speed, a fuel return conduit of reduced pressure relative to said fuel conduit, a variable orifice means between the fuel conduit and the return conduit, means varying the size of said variable orifice and the fuel delivered to said return conduit in accordance with parameters reflecting the air intake rate of the engine, and means responsive to a relatively high rate of fuel delivery to said fuel conduit for reducing the rate of increase of pressure differential across said orifice with increasing rate of fuel delivery to reduce the rate of increase in fuel flow through said orifice at high engine speeds.

References Cited in the file of this patent

UNITED STATES PATENTS

| | | |
|---|---|---|
| 2,136,959 | Winfield | Nov. 15, 1938 |
| 2,341,257 | Wünsch | Feb. 8, 1944 |
| 2,378,036 | Reggio | June 12, 1945 |
| 2,456,604 | Barfod et al. | Dec. 14, 1948 |
| 2,623,509 | Gold et al. | Dec. 30, 1952 |
| 2,673,556 | Reggio | Mar. 30, 1954 |
| 2,785,669 | Armstrong | Mar. 19, 1957 |

Notice of Adverse Decision in Interference

In Interference No. 90,512 involving Patent No. 2,876,755, H. Gold and D. M. Straight, Fuel injection system, final decision adverse to the patentees was rendered Aug. 20, 1963, as to claim 25.

[*Official Gazette November 12, 1963.*]